United States Patent [19]

Karsh

[11] 3,971,496
[45] July 27, 1976

[54] TAPE CENTERING METHODS AND APPARATUS

[75] Inventor: Irving Karsh, Los Angeles, Calif.

[73] Assignee: Bell & Howell Company, Chicago, Ill.

[22] Filed: Jan. 14, 1975

[21] Appl. No.: 541,036

[52] U.S. Cl. .................................... 226/3; 226/7; 226/15; 226/97
[51] Int. Cl.² ........................................ B65H 25/26
[58] Field of Search ...................... 226/3, 7, 15, 97

[56] References Cited
UNITED STATES PATENTS

| 3,420,424 | 1/1969 | Barbeau | 226/97 |
| 3,489,325 | 1/1970 | Epstein | 226/15 |

FOREIGN PATENTS OR APPLICATIONS

| 1,499,131 | 11/1969 | Germany | 226/15 |

Primary Examiner—Richard A. Schacher
Attorney, Agent, or Firm—Benoit Law Corporation

[57] ABSTRACT

An advancing tape is subjected to a first fluid pressure at one of its edge regions, and to a second fluid pressure at the other of its edge regions. The first fluid pressure is increased in response to movement of the mentioned one edge region away from a desired tape advance path. The tape is then returned to that desired tape advance path with the aid of the increased first fluid pressure. The second fluid pressure is increased in response to movement of the other edge region away from the desired tape advance path. The tape is thereupon returned onto the desired tape advance path with the latter increased second fluid pressure.

8 Claims, 4 Drawing Figures

U.S. Patent   July 27, 1976   3,971,496
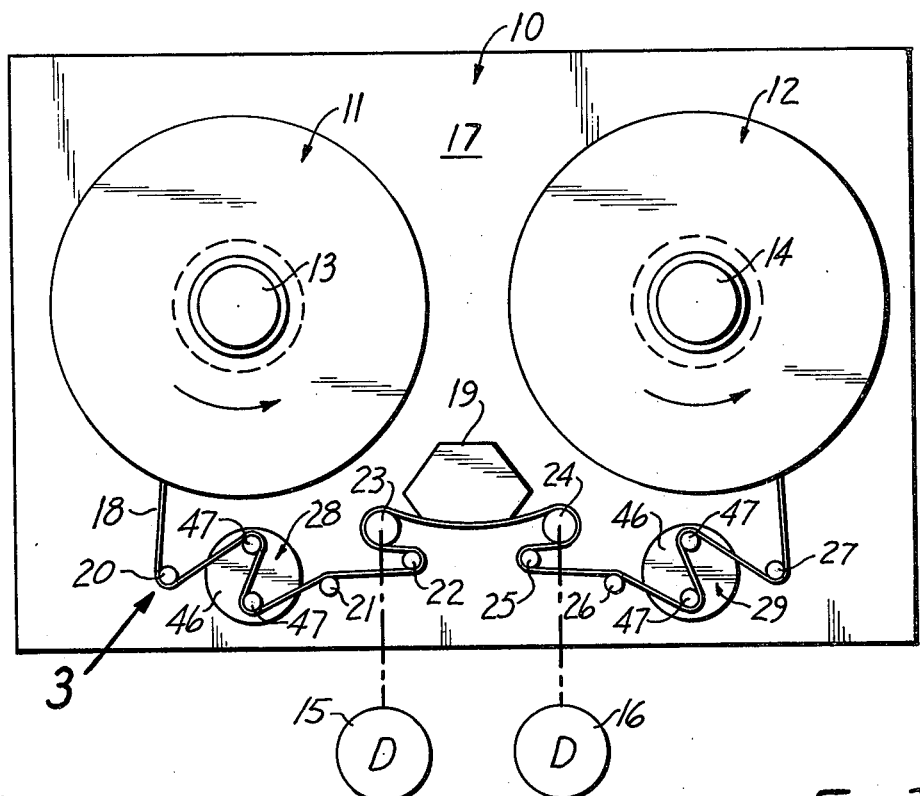
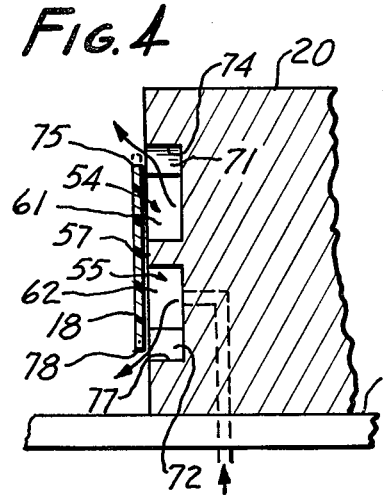
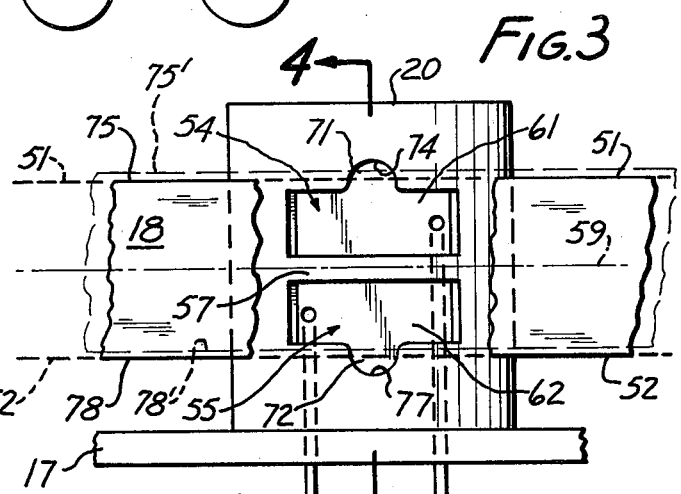
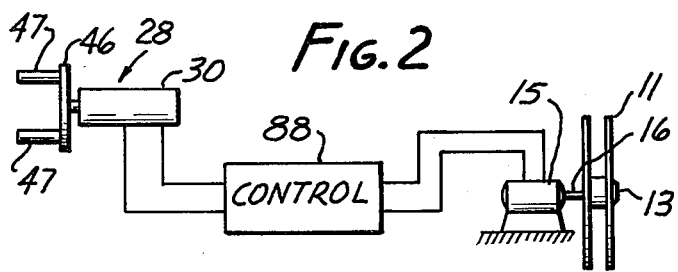

TAPE CENTERING METHODS AND APPARATUS

BACKGROUND OF THE INVENTION

1. Field of the Invention

The subject invention resides in methods and apparatus for centering advancing tapes and has utility in tape transports employed in magnetic tape recording equipment and in other applications where a tape or tape-like web is to be centered onto a desired tape or web advance path.

2. Description of the Prior Art

The most frequently employed method for centering an advancing tape onto a desired path resides in the provision of members defining one or two guide edges. In practice, this has imposed considerable wear and tear on the tape and has rendered the system sensitive to tape width tolerances and snakiness. In the case of information recording tape, the mentioned prior-art solution has also introduced scrape flutter into the information signal.

It had, therefore, been proposed that fluid bearings be employed for centering purposes. In this connection reference is made to the U.S. Pat. Nos. 2,848,820, 2,908,495, 2,954,911, 2,967,674, 3,032,246, 3,087,664, and 3,281,040.

In reviewing the proposals contained in these patents, it will be noted that some of them provide only a single fluid bearing at each guide, which impairs an efficient centering action. Some prior art has attempted to counter this by generating trough-like air jets. This, however, bent the tape edges away from the bearing and maintained the tape edges bent during the operation of the equipment, thereby disturbing a desired generally flat tape configuration.

Another proposal developed a transverse pressure gradient in a single fluid bearing chamber. This required the tape edge to slide along a guide surface, which made tape centering sensitive to the snakiness of commercial grade tapes. Another proposal, which also employed only a single bearing chamber, required the provision of upright fixed flanges which rendered the bearing sensitive to tape width tolerances and snakiness and which tended to introduce scrape flutter in response to tape contact of either of the flanges.

The above mentioned deficiencies of prior-art proposals and systems also resulted in a loss of data in the tape margin which was engaged by a guide surface.

SUMMARY OF THE INVENTION

It is a general object of this invention to overcome the above mentioned disadvantages.

It is a more specific object of the invention to provide improved tape transport equipment and techniques.

It is a similar object of this invention to provide improved methods and apparatus for centering a tape onto a desired tape advance path without the use of any guide edges which could be touched by the tape with resulting wear and tear, loss of data in the tape margin and incidental scrape flutter.

It is a related object of this invention to provide improved methods and apparatus for centering a tape onto a desired tape advance path in such a manner that lateral tape movements due to snakiness and similar causes occur always at the same tape location in any tape rerun with the same kind of equipment.

Other objects will become apparent in the further course of this disclosure.

From a first aspect thereof, the invention resides in a method of centering a tape having two edge regions onto a desired tape advance path, comprising in combination the steps of providing a pair of separate cavities at said tape advance path, providing each of said cavities with a lateral fluid flow orifice extending beyond the desired tape advance path, providing each of said cavities with a fluid bearing chamber having a larger effective cross-section than said lateral fluid flow orifice, covering both of said fluid bearing chambers with said tape, establishing independent fluid pressures in said cavitites, moving said tape along said desired tape advance path, maintaining both of said fluid bearing chambers covered by said tape during movement of said tape, subjecting said tape to a first fluid pressure with one of said fluid flow orifices at one of said edge regions, subjecting said tape to a second fluid pressure with the other of said fluid flow orifices at the other of said edge regions, increasing said first fluid pressure in response to movement of said one edge region away from said desired tape advance path in one direction by varying the effective cross-section of said one orifice with said one edge region, returning said tape onto said desired tape advance path with said increased first fluid pressure, increasing said second fluid pressure in response to movement of said other edge region away from said desired tape advance path in a direction opposite to said one direction by varying the effective cross-section of said other orifice with said other edge region, and returning said tape onto said desired tape advance path with said increased second fluid pressure.

From a second aspect thereof, the invention resides in a method of centering a tape having two edge regions onto a desired tape advance path, comprising in combination the steps of providing a first fluid flow orifice on a first side of said desired tape advance path providing a first fluid bearing chamber within said desired tape advance path having a larger effective cross-section than said first fluid flow orifice, providing a second fluid flow orifice on an opposite second side of said desired tape advance path providing a second fluid bearing chamber within said desired tape advance path having a larger effective cross-section than said second fluid flow orifice, moving said tape along said desired tape advance path, establishing a fluid pressure in said first fluid bearing chamber and flowing fluid through said first orifice, establishing a fluid pressure in said second fluid bearing chamber and flowing fluid through said second orifice, maintaining said first and second fluid bearing chambers covered by said tape during movement of said tape, reducing the effective cross-section of said first fluid flow orifice with one of said edge regions of the tape when said one edge region moves away from said desired tape advance path in one direction and providing fluid pressure through said reduction in effective cross-section of said fisrt fluid flow orifice for returning said tape onto said desired tape advance path, and reducing the effective cross-section of said second fluid flow orifice with the other of said edge regions of the tape when said other edge region moves away from said desired tape advance path in a direction opposite to said one direction and providing fluid pressure through said reduction in effective cross-section of said second fluid flow orifice for returning said tape onto said desired tape advance path.

From a third aspect thereof, the invention resides in apparatus for centering an advancing tape having two tape edge regions onto a desired tape advance path having two path edge regions corresponding to said tape edge regions, comprising in combination first means for subjecting said tape to a first fluid pressure at one of said tape edge regions, said first means include means defining a first cavity within a first side of said desired tape advance path and forming a first fluid bearing for said tape, second means distinct from said first means for subjecting said tape to a second fluid pressure at the other of said tape edge regions, said second means include means defining a second cavity within a second side of said desired tape advance path and forming a second a second fluid bearing for said tape, and means for separating said second cavity from said first catvity, third means connected to said first and second means for individually supplying pressurized fluid to said first and second means, fourth means connected to said first means for increasing said first fluid pressure in response to movement of said one tape edge region away from said desired tape advance path in one direction and for returning said tape to said desired tape advance path with said increased first fluid pressure, said fourth means including means defining an extension of said first cavity beyond one of said path edge regions to form a first fluid flow orifice having a variable effective cross-section relative to said one tape edge, and fifth means connected to said second means for increasing said second fluid pressure in response to movement of said other tape edge region away from said desired tape advance path in a direction opposite to said one direction and for returning said tape to said desired tape advance path with said increased second fluid pressure, said fifth means including means defining an extension of said first cavity beyond the other of said path edge regions to form a second fluid flow orifice having a variable effective cross-section relative to said other tape edge.

From yet a further aspect thereof, the invention resides in apparatus for centering an advancing tape having two tape edge regions onto a desired tape advance path having two path edge regions corresponding to said tape edge regions, comprising in combination a first fluid bearing for said tape extending from within one side of said desired tape advance path into a first area beyond one of said path edge regions, a second fluid bearing for said tape extending from within another side of said desired tape advance path into a second area beyond the other of said path edge regions, means for separating said first and second fluid bearings from each other, and means connected to said first and second fluid bearings for individually supplying pressurized fluid to said fluid bearings, said fluid supplying means including a source of pressurized fluid, first means for conducting pressurized fluid from said source to said first fluid bearing, and second means, distinct from said first means, for conducting pressurized fluid from said source to said second fluid bearing, said first conducting means including first means for regulating the flow of fluid from said source to said first fluid bearing, said second conducting means including second means, independent of said first regulating means, for regulating the flow of fluid from said source to said second fluid bearing, said first fluid bearing having a larger effective cross-section within said desired tape advance path than in said first area beyond said one path edge region, and said second fluid bearing having a larger effective cross-section within said desired tape advance path than in said second area beyond said other path edge region.

The expression "fluid" as herein employed is intended to refer broadly to gases, vapors and liquids. For practical reasons and in keeping with the most preferred embodiment presently contemplated by applicant, the further disclosure herein will be styled in terms of pressurized air being employed as the mentioned fluid. However, no limitation to air as the requisite fluid is thereby intended.

BRIEF DESCRIPTION OF THE DRAWINGS

The invention and its objects will become more readily apparent from the following detailed description of preferred embodiments thereof, illustrated by way of example in the accompanying drawings, in which like reference numerals designate like or functionally equivalent parts, and in which:

FIG. 1 is a plan view of a tape transport assembly which incorporates tape centering devices according to a preferred embodiment of the subject invention;

FIG. 2 is a diagram showing the use of a tension transducer to control a reel drive motor in combination with the tape centering action according to the subject invention;

FIG. 3 is an elevation, on an enlarged scale, of a tape centering device in accordance with a preferred embodiment of the subject invention, as seen in the direction of arrow 3 in FIG. 1; and FIG. 4 is a section, with parts broken away, taken on the line 4 — 4 in FIG. 3.

DESCRIPTION OF PREFERRED EMBODIMENTS

By way of background, the tape transport assembly shown in FIGS. 1 and 2 will first be described before reference is made to the specific construction of the tape centering devices according to the subject invention.

In particular, the tape transport shown in FIG. 1 includes a supply reel 11 and a take-up reel 12 which are mounted by suitable hubs 13 and 14, respectively, to drive shafts of corresponding drive motors, one of which is shown at 15 in FIG. 2 with a drive shaft 16 for the hub 13 of reel 11. A corresponding drive motor (not shown) is employed for the reel 12.

The tape supply and take-up reels 11 and 12 are mounted above a transport face or base plate 17.

A magnetic recording tape 18 extends from the supply reel 11 to the take-up reel 12 along a predetermined tape path.

A head assembly 19, which may include recording, playback and erasing heads, is located in the tape path and is connected to equipment (not shown) for recording, playing back and erasing information onto and from the magnetic tape 18.

The tape 18 proceeds from the supply reel along the mentioned tape path via a tape guide post 20, a tape tensioning device or transducer 28, tape guide posts or idler rollers 21 and 22, a tape drive capstan 23, the head assembly 19, a further tape drive capstan 24, tape guide posts or idler rollers 25 and 26, a further tape tensioning device or transducer 29, and a tape guide post 27.

The capstans 23 and 24 are driven by conventional motors or drives 15 and 16 whereby the magnetic tape 18 may be driven past the head assembly in either direction.

The tape transport 10 shown in FIG. 1, as well as the tape tension devices or transducers 28 and 29 are disclosed in U.S. Pat. No. 3,787,690, by Joseph J. Neff, issued Jan. 22, 1974, to the present assignee, and herewith incorporated by reference herein. As disclosed in that incorporated patent, each tape tension device or transducer functions within the transport 10 to maintain the tape 18 at the adjacent portion of the tape path within relatively narrow, predetermined limits of tape tension, to sense the instantaneous value of tape tension, and to generate a control signal which is indicative of sensed tape tension, and also to provide a buffer storage capacity for tape 18 in those instances where the adjacent tape reel 11 or 12 tends to overrun or underrun the adjacent tape drive capstan.

Each of the tape tensioning devices or transducers 28 and 29 has a pair of tape guide rollers 47 mounted on a circular carrier plate 46 which is connected to a rotary signal generator 30. The tape 18 engages each pair of tape guide rollers 47 to form a variable tape loop. As more fully disclosed in the incorporated patent, the signal generator 30 produces a signal which varies in accordance with variations of the tape loop at the particular tensioning device or transducer.

This signal is applied to a control 88 which, in turn, varies the energization of the corresponding tape drive, such as the tape drive 15 shown in FIG. 2, so that overrunning or underrunning of the particular tape reel is avoided.

In accordance with a preferred embodiment of the subject invention, the tape guide posts so far mentioned may be of the type illustrated in FIGS. 3 and 4. This will now be explained relative to the tape guide post 20 which serves as a turnabout for the tape proceeding from or to the variable diameter tape roll on the adjacent reel into and from the tape path leading to and from the head assembly 19.

An important object of the illustrated preferred embodiment of the invention is to center the advancing tape 18 onto a desired tape advance path, the opposite edge regions of which are indicated in FIG. 3 by dotted lines 51 and 52. In accordance with the subject invention, this is to be accomplished without the use of any guide edges or surfaces that would be contacted by edge portions of the tape.

To this end, the tape guide post 20 includes a pair of first and second fluid bearings 54 and 55 which, as best seen in FIG. 4, maintain the tape 18 riding on a fluid film ahving a very low coefficient of friction. The guide post 20 comprises a wall portion 57 for separating the first and second fluid bearings from each other.

The first fluid bearing 54 extends from within one side of the desired tape advance path into a first area beyond the path edge region 51. Similarly, the second fluid bearing 55 extends from within another side of the desired tape advance path into a second area beyond the other path edge region 52.

In the illustrated preferred embodiment, the fluid bearings 54 and 55 are located on opposite sides of a longitudinal axis of symmetry 59 in the desired tape advance path between the path edge regions 51 and 52. Moreover, the first fluid bearing 54 includes a first cavity 61 within the mentioned first side of the desired tape advance path. Similarly, the second fluid bearing includes a second cavity 62 within a second side of the desired tape advance path.

A pair of separate and distinct conduits 64 and 65 extend from a common source of pressurized fluid 66, such as an air compressor, to the cavities 61 and 62, respectively, to supply pressurized fluid to the fluid bearings 54 and 55. Individually and separately adjustable valves or other regulating devices 68 and 69 are located in the conduits 64 and 65, respectively, in order to enable the individual metering of fluid supplied to each of the bearings and the individual adjustment of fluid pressure provided thereby.

The cavity 61 of the first fluid bearing 54 has an extension 71 beyond the desired path edge 51. Similarly, the cavity 62 of the fluid bearing 55 has an extension 72 beyond the desired path edge 52.

In this manner, the cavity extension 71 forms a first fluid flow orifice 74 having a variable effective cross-section relative to the adjacent tape edge 75. Similarly, the cavity extension 72 forms a second fluid flow orifice 77 having a variable effective cross-section relative to the other tape edge 78.

During the operation of the illustrated equipment, the tape 18 moves along the desired path delimited by the path edge portions 51 and 52. The two fluid bearings 54 and 55 center the tape 18 onto the desired tape path. If the tape 18 moves laterally so that the tape edge region 75 moves away from the desired tape advance path onto first fluid orifice 74, as indicated by the dotted lines 75' and 78' in FIG. 3, the effective cross-section of the orifice 74 is automatically reduced by the tape edge region 75. In consequence, the first fluid pressure in the fluid bearing 54 is automatically increased in response to movement of the tape edge region 75 away from the desired tape advance path delimited by the desired tape advance path edges 51 and 52.

Conversely, the effective cross-section of the orifice 77 is automatically increased when the tape edge region 78 moves further onto the desired tape advance path or, in other words, moves toward the symmetry axis 59, as indicated by the dotted line 78'.

Accordingly, the fluid pressure in the second air bearing 55 is decreased when the laterally moving tape increases the first fluid pressure in the fluid bearing 54.

The increased fluid pressure in the first bearing 54 tends to lift the tape edge region 75 when the same has moved laterally as indicated at 75' in FIG. 3. Since the fluid film on which the tape 18 is riding by operation of the fluid bearings 54 and 55 has a very low coefficient of friction, the tape 18 will tend to slide down off the lifted position and towards the center position on the desired tape advance path. This will automatically center the tape onto the desired path.

Mutatis mutandis, the tape edge region 78 will reduce the effective cross-section of the orifice 72 when the tape 18 laterally moves so that the tape edge region 78 moves away from the desired tape advance path. Simultaneously, the effective cross-section of the orifice 71 will be simultaneously increased as the tape edge region 75 moves toward the axis 59. In consequence, the fluid pressure in the bearing 55 will increase as the fluid pressure in the bearing 54 is decreased by the laterally moving tape.

Accordingly, the increased fluid pressure in the bearing 55 will tend to lift the tape edge region 78 and the tape will slide down the low-friction fluid film and will automatically center itself onto the desired tape advance path.

It will thus be recognized that the subject invention automatically returns the tape 18 onto the desired tape advance path with the increased first and second fluid pressures. In considering the illustrated preferred embodiment, it will be noted that the first fluid bearing 54 has a larger effective cross-section within the desired tape advance path where the proper of the cavity 61 or fluid bearing chamber is located, than in the area beyond the path edge region 51 where the cavity extension in the form of the orifice 71 is located. Similarly, the fluid bearing 55 has a larger effective cross-section within the desired tape advance path where the proper of the cavity 62 is located, than in an area beyond the path edge region 52 where the cavity extension 72 in the form of the orifice 72 is situated. While these cavity proportions are not mandatory, they do have the advantage that the tape 18 is capable of riding on an adequate air film and of changing the bearing fluid pressures very rapidly in response to lateral deviations from the desired tape advance path.

While the invention has been illustrated in the drawings in terms of a tape guide post, it should be recognized that the subject invention may be employed in other implementations where an advancing tape or similar traveling web or strip is to be automatically centered.

The subject extensive disclosure will suggest or render apparent various modifications and variations within the spirit and scope of the subject invention to those skilled in the art.

I claim:

1. A method of centering a tape having two edge regions onto a desired tape advance path, comprising in combination the steps of:
   providing a pair of separate cavities at said tape advance path;
   providing each of said cavities with a lateral fluid flow orifice extending beyond the desired tape advance path;
   providing each of said cavities with a fluid bearing chamber having a larger effective cross-section than said lateral fluid flow orifice;
   covering both of said fluid bearing chambers with said tape;
   establishing independent fluid pressures in said cavities;
   moving said tape along said desired tape advance path;
   maintaining both of said fluid bearing chambers covered by said tape during movement of said tape;
   subjecting said tape to a first fluid pressure with one of said fluid flow orifices at one of said edge regions;
   subjecting said tape to a second fluid pressure with the other of said fluid flow orifices at the other of said edge regions;
   increasing said first fluid pressure in response to movement of said one edge region away from said desired tape advance path in one direction by varying the effective cross-section of said one orifice with said one edge region;
   returning said tape onto said desired tape advance path with said increased first fluid pressure;
   increasing said second fluid pressure in response to movement of said other edge region away from said desired tape advance path in a direction opposite to said one direction by varying the effective cross-section of said orifice with said other edge region; and
   returning said tape onto said desired tape advance path with said increased second fluid pressure.

2. A method as claimed in claim 1, wherein:
   said one edge region of the tape is employed for increasing said first fluid pressure when said one edge region moves away from said desired tape advance path in one direction; and
   said other edger region of the tape is employed for increasing said second fluid pressure when said other edge region moves away from said desired tape advance path in a direction opposite to said one direction.

3. A method of centering a tape having two edge regions onto a desired tape advance path, comprising in combination the steps of:
   providing a first fluid flow orifice on a first side of said desired tape advance path;
   providing a first fluid bearing chamber within said desired tape advance path having a larger effective cross-section than said first fluid flow orifice;
   providing a second fluid flow orifice on an opposite second side of said desired tape advance path;
   providing a second fluid bearing chamber within said desired tape advance path having a larger effective cross-section than said second fluid flow orifice;
   moving said tape along said desired tape advance path;
   establishing a fluid pressure in said first fluid bearing chamber and flowing fluid through said first orifice;
   establishing a fluid pressure in said second fluid bearing chamber and flowing fluid through said second orifice;
   maintaining said first and second fluid bearing chambers covered by said tape during movement of said tape;
   reducing the effective cross-section of said first fluid flow orifice with one of said edge regions of the tape when said one edge region moves away from said desired tape advance path in one direction and providing fluid pressure through said reduction in effective cross-section of said first fluid flow orifice for returning said tape onto said desired tape advance path; and
   reducing the effective cross-section of said second fluid flow orifice with the other said edge regions of the tape when said other edge region moves away from said desired tape advance path in a direction opposite to said one direction and providing fluid pressure through said reduction in effective cross-section of said second fluid orifice for returning said tape onto said desired tape advance path.

4. A method as claimed in claim 3, including the step of physically separating said first and second fluid flow orifices from each other.

5. Apparatus for centering an advancing tape having two tape edge regions onto a desired tape advance path having to path edge regions corresponding to said tape edge regions, comprising in combination:
   first means for subjecting said tape to a first fluid pressure at one of said tape edge regions, said first means include means defining a first cavity within a first side of said desired tape advance path and forming a first fluid bearing for said tape;
   second means distinct from said first means for subjecting said tape to a second fluid pressure at the other of said tape edge regions, said second means include means defining a second cavity within a second side of said desired tape advance path and forming a second fluid bearing for said tape, and means for separating said second cavity from said first cavity;

third means connected to said first and second means for individually supplying pressurized fluid to said first and second means;

fourth means connected to said first means for increasing said first fluid pressure in response to movement of said one tape edge region away from said desired tape advance path in one direction and for returning said tape to said desired tape advance path with said increased first fluid pressure, said fourth means including means defining an extension of said first cavity beyond one of said path edge regions to form a first fluid flow orifice having a variable effective cross-section relative to said one tape edge; and fifth means connected to said second means for increasing said second fluid pressure in response to movement of said other tape edge region away from said desired tape advance path in a direction opposite to said one direction and for returning said tape to said desired tape advance path with said increased second fluid pressure, said fifth means including means defining an extension of said first cavity beyond the other of said path edge regions to form a second fluid flow orifice having a variable effective cross-section relative to said other tape edge.

6. Apparatus as claimed in claim 5, wherein:
said third means include sixth means connected to said first means for supplying pressurized fluid to said first means, and seventh means distinct from said sixth means and connected to said second means for supplying pressurized fluid to said second means independently of said sixth means.

7. Apparatus for centering an advancing tape having two edge regions onto a desired tape advance path having two path edge regions corresponding to said tape edge regions, comprising in combination:

a first fluid bearing for said tape extending from within one side of said desired tape advance path into a first area beyond one of said path edge regions;

a second fluid bearing for said tape extending from within another side of said desired tape advance path into a second area beyond the other of said path edge regions;

means for separating said first and second fluid bearings from each other; and means connected to said first and second fluid bearings for individually supplying pressurized fluid to said fluid bearings;

said fluid supplying means including a source of pressurized fluid, first means for conducting pressurized fluid from said source to said first fluid bearing, and second means, distinct from said first means, for conducting pressurized fluid from said source to said second fluid bearing;

said first conducting means including first means for regulating the flow of fluid from said source to said first fluid bearing;

said second conducting means including second means, independent of said first regulating means, for regulating the flow of fluid from said source to said second fluid bearing;

said first fluid bearing having a larger effective cross-section within said desired tape advance path than in said first area beyond said one path edge region; and said second fluid bearing having a larger effective cross-section within said desired tape advance path than in said second area beyond said other path edge region.

8. Apparatus as claimed in claim 7, wherein:
said first and second fluid bearings are located on opposite sides of a longitudinal axis of symmetry in said desired tape advance path.

* * * * *